Sept 17, 1957
E. H. OLSON
2,806,924
CONTROL DEVICE
Filed Aug. 30, 1954
2 Sheets-Sheet 1
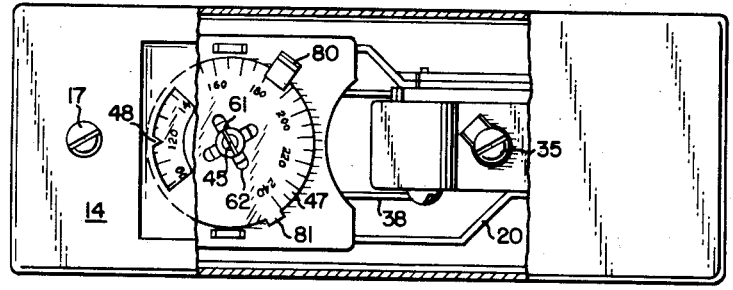
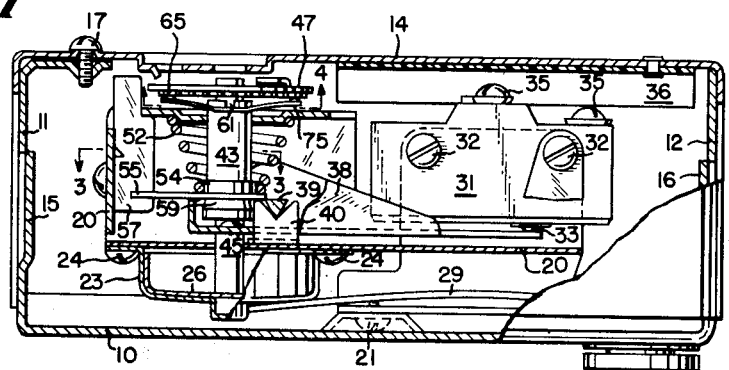
INVENTOR
ELWYN H. OLSON
BY George H Fisher
ATTORNEY Sept 17, 1957 — E. H. OLSON — 2,806,924
CONTROL DEVICE Filed Aug. 30, 1954 — 2 Sheets-Sheet 2

INVENTOR
ELWYN H. OLSON
BY George H Fisher
ATTORNEY

United States Patent Office 2,806,924
Patented Sept. 17, 1957

2,806,924
CONTROL DEVICE

Elwyn H. Olson, St. Paul, Minn., assignor to Minneapolis-Honeywell Regulator Company, Minneapolis, Minn., a corporation of Delaware Application August 30, 1954, Serial No. 453,059

9 Claims. (Cl. 200—139)

This invention relates to condition responsive control devices and is particularly directed to an adjustable means for limiting the condition value control adjustment.

In the field of condition responsive control devices such as temperature responsive devices for controlling fluid temperature it is often desirable to have adjustable maximum or minimum control value limits for the various applications of the same device. For example, in a temperature responsive device of the fluid expansion type used to control water temperatures in a boiler it is advantageous to have a means of adjusting the maximum possible control value setting so the same device can be used on boilers of various manufacturers that may have different maximum temperatures or pressures they feel is safe for their equipment. Also in the control device of the combination fan and limit switch type used to control hot air furnaces, various manufacturers have designed their equipment for different maximum bonnet temperatures. Also in some areas code requirements differ from other areas and require equipment designed so that the home owner cannot adjust the limit setting above a prescribed temperature. My invention consists of a maximum or minimum limit stop that may be incorporated in control devices of these types and which allows the device to be adjusted by a service man or mechanic to fit the requirements. This adjustment is easily accessible to one familiar with the device and readily made while still not obvious or easily discovered by one not mechanically inclined or not familiar with the device. Therefore it will not be inadvertently set beyond safe limits by the home owner or will not be misadjusted by the unskilled person or children that may tamper with it.

One object of my invention is to provide a limit setting stop for condition responsive control devices. Another object of my invention is to provide such a device that is easily accessible and readily adjustable by one familiar with the device. A further object of my invention is to provide such a device that is relatively safe from misadjustment by unskilled persons.

Figure 5:
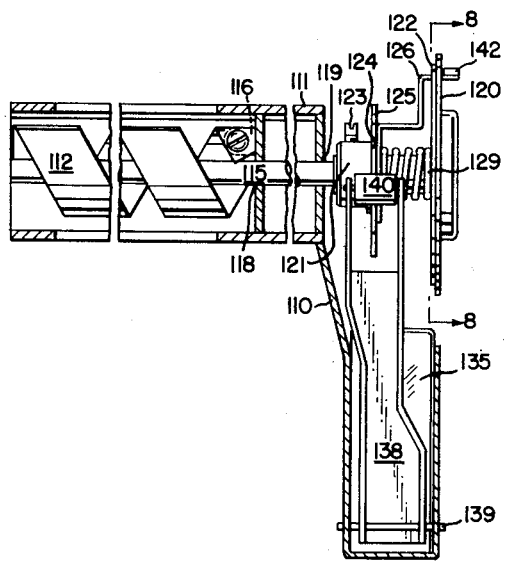
Figure 6:
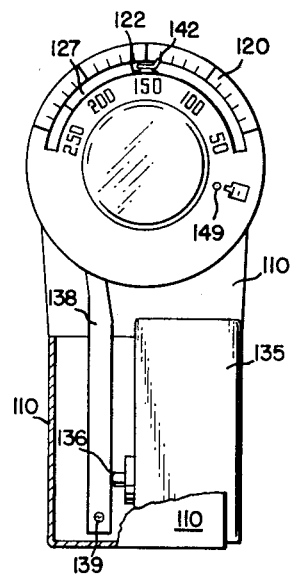
Figure 7:
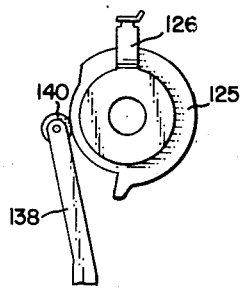
Figure 8:
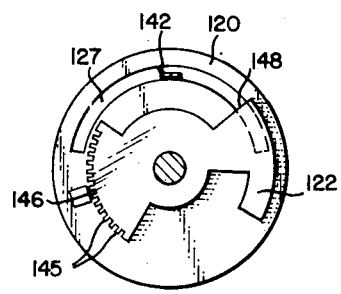

Figure 1 is an elevation, partly in section, of an insertion temperature sensitive switch utilizing a first embodiment of my invention; Figure 2 is a plan view, partly in section, of the device shown in Figure 1; Figure 3 is a fragmentary section taken on line 3—3 of Figure 1; Figure 4 is a fragmentary view as seen from below the adjusting dial; Figure 5 is a side elevation, partly in section, of a limit control for a warm air furnace incorporating a second embodiment of my invention; Figure 6 is a front elevation of the device shown in Figure 5; Figure 7 is a fragmentary view of the cam and follower of the device of Figure 5; Figure 8 is a fragmentary plan view taken on lines 8—8 of Figure 5.

The first embodiment of my invention will be described in connection with an immersion thermostat of the type shown in the patent of Murrell F. Kautz, 2,748,225 issued May 29, 1956 on an application filed March 2, 1953. As seen in Figures 1 and 2, a frame 10 in the form of a shallow channel has upwardly extending end portions 11 and 12 which cooperate with a cover 14 to provide an enclosure for mechanism to be described below. Knockouts 15 and 16 are provided in the frame end portions and either one may be removed to accommodate electrical wiring. A screw 17 secures the cover 14 to the frame 10. A sub-frame 20 is secured to the frame 10 by a pair of screws 21. A cup-shaped chamber 23 is secured to the sub-frame by screws 24 and in conjunction with the cup-shaped diaphragm 26 forms an expansible chamber whose volume may be changed by varying the amount of fluid admitted between the diaphragm and the chamber. The diaphragm 26 is joined to the chamber 23 at its periphery in any suitable manner such as by seam welding. Chamber 23 is connected to a sensing bulb 28 by flexible capillary tube 29 and the diaphragm chamber, tube and bulb are filled with a thermostatic liquid. It will be understood that an increase of temperature of the bulb 28 will force liquid through the tube 29 into the diaphragm chamber to raise the central portion of the diaphragm 26. A snap switch 31 of the type disclosed in McGall 1,960,020 is secured to the sub-frame 20 by screws 32 and is actuated as a thermostatic element by a mechanism to be described below. The switch 31 has an actuating button 33 which actuates the switch mechanism between two operated positions, depending upon the position of the button 33. Switch 31 is provided with screw terminals 35. A sheet of insulating material 36 is secured to the inside of the cover 14 and overlies the terminals 35 to prevent the possibility of an eelctrical connection to the cover.

A lever 38 has a knife edge 39 secured thereto. The knife edge 39 engages a saddle 40 carried by the sub-frame 20 to provide a pivot to the lever 38 in the frame. It will be understood that the saddle 40 provides a pair of spaced pivots, one located on each side of the lever 38 to establish a stable pivotal axis for the lever. The right hand end of the lever 38 extends beneath the switch button 33 and is adapted to actuate the switch. The left hand end of the lever 38 extends beneath a nut 43 which is in screw-threaded engagement with a rod 45 whose lower end is guided by an opening in the sub-frame 20. The bottom of the rod 45 is in abutting engagement with the diaphragm 26. The nut 43 has a cylindrical upper portion which is guided in an opening in the upper portion of the sub-frame 20. It will be seen that both the nut 43 and the rod 45 may be rotated and moved axially in the sub-frame 20. Upon an increase in temperature the diaphragm 26 will raise the rod 45 and nut 43 which will, in turn, raise the left hand end of the lever 38. This will result in lowering the right hand end of the lever 38 and permit the switch button 33 to move outwardly. A decrease in temperature will, of course, cause the lever 38 to push the button 33 inwardly. Control point of the thermostat may be adjusted by rotating the dial 47 which is staked to the upper end of the rod 45, to change the distance between the diaphragm 26 and the lower surface of the nut 43. Suitable indicia of temperature are disposed on the dial 47, and the index 48 on the cover 14 indicates the temperature at which the switch will be actuated. The cover 14 is provided with a window through which the indicia may be read. Another opening is provided in the cover for access to a slot in the rod 45 so that it may be adjusted with a screw driver when the cover is in place.

The bottom end of the rod 45 is not attached to the diaphragm 26 but is merely in abutting relation thereto and to cause the rod 45 to follow the diaphragm a spring 52 is provided to bias the nut 43 and rod 45 downwardly. The top end of the spring 52 acts against the sub-frame 20 and the bottom end acts on a collar 54 on the nut 43. The collar 54 is prevented from turning when the rod 45 is turned by a lateral extension 55 which cooperates with a guide 57 carried by the sub-frame 20 as best seen in Figure 3. The collar 54 is slidable on the cylindrical surface of the nut 43 and is biased by the spring 52 into engagement with a conical surface 59 on the nut 43. The angle of the conical surface 59 is such that the force of the spring 52 produces sufficient frictional resistance to rotation to prevent rotation of the nut 43 and rotation of the rod 45. Hence, normal adjustment of the control point by rotation of the dial 47 results only in changing the distance between the diaphragm 26 and the lower surface of the nut 43 as briefly described above. In order to calibrate the device, that is to bring the temperature indicated on the dial 47 into agreement with the actual temperature at which the switch 31 is actuated, the nut 43 may be turned against the frictional force provided by the spring 52. To facilitate turning the nut 43 its upper end is provided with notches 61 which are accessible through openings 62 adjacent the center of the dial 47. By turning the dial 47 so that a pair of these openings are in alignment with the notches 61 it is possible to insert a tool in the nature of a bifurcated screw driver which spans the rod 45 and engages the notches 61. The rod 45 and nut 43 are then turned together until the nut 43 is in its proper angular position in the sub-frame 20. The upper extremity of the guide 57 serves as an index for the indicia on the dial 47 when the cover 14 is removed.

In order to limit the control point adjustment setting, that is to limit the dial setting at which the device may be set to function, a member 65 is provided that engages the back of the dial 47. A plurality of lugs 67 on the back of dial 47 cooperate with an annular surface 68 on member 65 to provide a bearing for member 65 on the dial 47. A plurality of notches 70 are cut in a portion of the outer periphery of member 65 leaving a plurality of teeth 71 suitable to engage and cooperate with an abutment 73 in the form of a lug on the back of dial 47 to prevent relative movement of member 65 on dial 47. Abutment 73 as well as lugs 67 may be formed as partial punchings from the material of dial 47. A leaf spring 75 has a pair of tabs 76 that fit in notches 61 in nut 43 to support the center portion thereof. The two ends of spring 75 bias member 65 against dial 47 with abutment 73 normally in engagement with a pair of the plurality of teeth 71. The member 65 may be moved against the bias of spring 75 sufficiently to disengage teeth 71 from abutment 73 to allow pivotal movement of member 65 relative to dial 47 to the desired angular relationship. Upon release the spring 75 will again bias member 65 against dial 47 with abutment 73 engaging an appropriate pair of teeth 71. An abutment 80 on member 65 cooperates with the upper extremity of the guide 57 to limit the amount member 65, dial 47, and rod 45 may be rotated in a clockwise direction when adjusting the control point of the device through dial 47. An abutment 81 on dial 47 cooperates with the upper extremity of the guide 57 to limit the amount of possible counterclockwise rotation of dial 47. The adjustment of the position of the member 65 relative to dial 47 is readily made by inserting a sharp edge such as a knife blade back of dial 47 in between dial 47 and member 65 and prying member 65 away from dial 47 sufficiently to have member 65 clear abutment 73 allowing pivotal movement of member 65 relative to dial 47. With the notches disposed as shown in Figure 4 it is possible to locate abutment 80 in ten degree increments between 100° and 240°. The setting shown in Figure 2 might be satisfactory for a device used as a high limit control on a boiler, whereas a setting of 140° might be suitable for a device used to control the temperature of domestic hot water.

Referring to Figures 5 through 8 for a second embodiment of my invention, Figure 5 is an elevation, partly in section, of a temperature control device adapted for use as a limit switch for a warm air furnace. A frame 110 is secured to a tube 111 which houses a bimetal 112. The bimetal 112 is supported at the left end by a rod 115 and is secured at the right end to a bracket 116 attached to tube 111. The rod 115 is pivotally supported in tube 111 by bearings at 118 and 119. Bimetal 112 angularly positions the rod 115 in accordance with temperature. Rod 115 extends out to the right of tube 111 and supports the adjustment mechanism and a cam for the switching mechanism. A dial 120 is staked to the right end of a hub 121 which is secured to the right end of rod 115 by a set screw 123. Hub 121 is of larger diameter at the left end than at the right end resulting in an abutment 124 at the juncture of the two diameters. A cam 125 has attached thereto a lever arm 126 that extends through an arcuate opening 127 in dial 120. A spring 129 is disposed on the right end of hub 121 and biases cam 125 against abutment 124 of hub 121 and biases a member 122 against the back of dial 120. The force of spring 129 is sufficient to cause cam 125 to frictionally engage and rotate with hub 121 when rod 115 rotates. A snap-acting switch 135 with an actuator 136 is mounted in frame 110. A lever arm 138, pivotally mounted at 139 in frame 110, has a roller follower 140 that engages the surface of cam 125. The lever arm 138 operates switch 135 by depressing or releasing actuator 136. Suitable indicia of temperature on the face of dial 120 cooperate with an index 142 on lever arm 126 to indicate the temperature at which the switch 135 will be actuated.

Various furnace manufacturers specify different maximum temperatures in their equipment. My invention facilitates the use of such a control device on any of these various furnaces with different maximum limit settings. The member 122 is mounted on hub 121 so that member 122 may be rotated relative to dial 120. On an arcuate portion of member 122 are a plurality of teeth 145 as seen in Figure 8. An abutment 146 on the back of dial 120 cooperates with two of the teeth 145 to normally prevent pivotal movement of member 122 relative to dial 120. Abutment 146 may be stamped out of the material of dial 120. Spring 129 normally holds member 122 in engagement with dial 120 with abutment 146 and a pair of teeth 145 cooperating. A portion of member 122 overlies the arcuate opening 127 in dial 120. The portion of arcuate opening 127 covered by member 122 is not available to control value setting by lever 126. The edge 148 of member 122 acts as a stop for lever 126. To reposition the member 122 on dial 120 a small port 149 is left in dial 120 opposite the abutment 146. By inserting a small diameter rod or the like in port 149 member 122 may be pushed away from dial 120 sufficiently to allow rotation of member 122 relative to dial 120 and the selection of a new position of stop edge 148 with abutment 146 engaging a different pair of teeth 145.

While the invention has been described in connection with two different types of temperature responsive switches, it will be evident that the invention would be equally applicable to control means other than switches. Likewise, condition responsive elements other than temperature responsive as described may be employed. Although the two embodiments of my invention have been described as providing high limit stops, the invention can easily be adapted for use as a low limit stop. It is to be understood that the scope of the invention is to be limited only by the appended claims.

I claim as my invention:

1. A control device comprising, a frame, condition responsive means carried by said frame, control means carried by said frame, a mechanical linkage operating said control means in response to said condition responsive means, said mechanical linkage including a rod axially positioned by said condition responsive means, a dial carried by the end of said rod opposite said condition responsive means, rotation of said dial also rotating said rod and changing the control point of said control device, cooperating indicia on said dial and on said frame exhibiting condition value in accordance with the rotative position of said rod, a member normally engaging said dial, spring means biasing said member toward said dial, a plurality of notches in an arcuate portion of said member, an abutment on the back of said dial disposed to cooperate with any one of said plurality of notches on said member and restrict pivotal movement of said member relative to said dial, and cooperating abutments on said member and said frame limiting rotation of said dial.

2. A control device comprising, a frame, condition responsive means carried by said frame, control means carried by said frame, a mechanical linkage operating said control means in response to said condition responsive means, said mechanical linkage including a rod axially positioned by said condition responsive means, a dial carried by the end of said rod opposite said condition responsive means, cooperating indicia on said dial and on said frame exhibiting condition value in accordance with the rotative position of said rod, rotation of said dial and said rod changing the control point of said control device, a member normally engaging said dial, spring means biasing said member toward said dial, a plurality of notches in an arcuate portion of said member, an abutment on the back of said dial disposed to cooperate with any one of said plurality of notches on said member and restrict pivotal movement of said member relative to said dial, said member being movable against the bias of said spring means sufficiently to allow disengagement of said abutment from one of said notches on said member and to allow selection of another of said notches on said member, and cooperating abutments on said member and said frame limiting rotation of said dial, the position of said abutment on said member relative to said dial being determined by which of said notches on said member is engaged by said abutment on the back of said dial.

3. A control device comprising, a frame, a condition responsive means carried by said frame, control means carried by said frame, a mechanical linkage operating said control means in response to said condition responsive means, said mechanical linkage including a rod axially positioned by said condition responsive means, a dial carried by the end of said rod opposite said condition responsive means, rotation of said dial also rotating said rod and changing the control point of said control device, cooperating indicia on said dial and on said frame exhibiting condition value in accordance with the rotative position of said rod, a member normally engaging said dial, a spring means biasing said member toward said dial, a plurality of teeth with appropriate spacing in between on an arcuate portion of said member, an abutment on the back of said dial disposed to cooperate with any pair of said plurality of teeth on said member, said cooperating of said abutment and one pair of said teeth restricting pivotal movement of said dial relative to said member, said member being movable against the bias of said spring means sufficient to allow disengagement of said abutment and one pair of said teeth and allow selection of another pair of said teeth for engagement with said abutment, and cooperating stops on said member and said frame limiting the rotation of said dial.

4. A control device comprising, a rotatable dial with indicia of condition value, said dial cooperating with control point setting means of said control device, a member coaxially mounted with said dial and normally engaging said dial, spring means biasing said member against said dial, cooperating means on said scale plate and said member normally preventing pivotal movement of said member relative to said dial, a plurality of said cooperating means on said member to allow a plurality of positions of said member relative to said dial, movement of said member against said spring means allowing a selection of any one of a plurality of positions of said member relative to said dial, and a stop on said member limiting the rotation of said dial and thus limiting the portion of said dial indicia available for condition value control adjustment.

5. A control device comprising, a rotatable dial, indicia of condition value on said dial, said dial adapted to adjust the control point of said control device, an abutment on the back of said dial, a member adjacent the back of said dial normally engaging said dial, spring means biasing said member against said dial, a plurality of notches in an arcuate portion of said member, said abutment on the back of said dial disposed to cooperate with any one of said plurality of notches in said member, said member and said dial coaxially mounted to allow pivotal movement of said member relative to said dial, movement of said member against the bias of said spring means sufficient to allow disengagement of said abutment and one of said notches on said member and to allow selection of another of said notches on said member to be engaged by said abutment, and a stop on said member, the position of said stop relative to said dial indicia being determined by which of said notches is engaged by said abutment on the back of said dial, said stop limiting the rotation of said dial and thus limiting the portion of said dial indicia available for condition value control adjustment.

6. A control device comprising, a rotatable dial, said dial adapted to adjust the control point of said control device, indicia of condition value on said dial, an abutment on the back of said dial, a member adjacent the back of said dial normally engaging said dial, spring means biasing said member against said dial, a plurality of teeth with appropriate spacing in between on an arcuate portion of said member, said abutment on the back of said dial disposed to cooperate with any pair of said plurality of teeth on said member, said abutment and one of said pair of plurality of teeth normally cooperating to restrict movement of said dial relative to said member, plurality of posts on the backside of said dial, a circular opening in the center of said member, said circular opening disposed to engage and cooperate with said plurality of posts for guiding pivotal movement of said member relative to said dial, movement of said member against spring means sufficient to allow disengagement of said abutment and a pair of said teeth to allow selection of another pair of said teeth for engagement by said abutment upon pivotal movement of said member relative to said dial, and a stop on said member limiting the rotation of said dial and thus limiting the portion of said dial indicia available for condition value control adjustment.

7. A control device comprising, condition responsive means, control means, a mechanical linkage interconnecting said means, said linkage including first and second members relatively rotatable to vary the connection between said means and thereby determine the condition value at which said condition responsive means actuates said control means, the first of said members having a dial and the second of said members having an abutment disposed adjacent said dial, a plate pivotally mounted on said first member on the axis of relative rotation of said members, said plate having an abutment portion adapted to engage the abutment on said second member, cooperating projections on said plate and said dial engageable at a plurality of relative angular positions of said dial and said plate, and a spring acting axially between said first member and said plate biasing said plate against said dial with cooperating projections in engagement, said plate being movable against the bias of said spring to disengage said projections and permit relative rotation of said plate and said dial and the abutment disposed adjacent said dial and the abutment portion of said plate thereby limiting the portion of said dial indicia available for condition value control adjustment.

8. A control device comprising, a rotatable dial with indicia of condition value, said dial cooperating with control point setting means of said control device, a member coaxially mounted with said dial and normally engaging said dial, spring means biasing said member against said dial, a plurality of notches in an arcuate portion of said member, an abutment on the back of said dial disposed to cooperate with any one of said plurality of notches on said member and restrict pivotal movement of said member relative to said dial, and a stop on said member limiting the rotation of said dial and thus limiting the portion of said dial indicia available for condition value control adjustment.

9. A control device comprising, condition value indicia means including a dial and an index relatively rotatable to each other, said condition value indicia means co-operating with control point setting means of said control device, a member coaxially mounted with said dial and normally engaging said dial, spring means biasing said member against said dial, co-operating means on said dial and said member normally preventing pivotal movement of said member relative to said dial, a plurality of said cooperating means on said member to allow a plurality of positions of said member relative to said dial, movement of said member against said spring means allowing a selection of any one of a plurality of positions of said member relative to said dial, and a stop on said member limiting the relative rotation of said dial and said index and thus limiting the portion of said condition value indicia means available for condition value control adjustment.

References Cited in the file of this patent

UNITED STATES PATENTS

| | | |
|---|---|---|
| 2,402,151 | Dewey | June 18, 1946 |
| 2,523,352 | Behr | Sept. 26, 1950 |
| 2,587,351 | Manning | Feb. 26, 1952 |
| 2,614,185 | Henry | Oct. 14, 1952 |